United States Patent [19]
Robinson

[11] Patent Number: 5,655,756
[45] Date of Patent: Aug. 12, 1997

[54] ENERGY ABSORBERS AND METHODS OF MANUFACTURE

[75] Inventor: William Henry Robinson, Eastbourne, New Zealand

[73] Assignee: Damping Systems Limited, Auckland, New Zealand

[21] Appl. No.: 454,254

[22] PCT Filed: Dec. 6, 1993

[86] PCT No.: PCT/NZ93/00122

§ 371 Date: Aug. 21, 1995

§ 102(e) Date: Aug. 21, 1995

[87] PCT Pub. No.: WO94/13974

PCT Pub. Date: Jun. 23, 1994

[30] Foreign Application Priority Data

Dec. 4, 1992 [NZ] New Zealand ............... 245378

[51] Int. Cl.⁶ ............... F16M 5/00; F16F 3/08
[52] U.S. Cl. ............... 267/140.2; 267/152
[58] Field of Search ............... 267/292, 293, 267/294, 140.2, 140.4, 141.1, 151, 153, 152; 248/566, 575; 52/167.1, 167.7

[56] References Cited

U.S. PATENT DOCUMENTS

| | | | |
|---|---|---|---|
| 3,134,585 | 5/1964 | Trask | 267/141.1 X |
| 4,593,502 | 6/1986 | Buckle | 52/167.1 |
| 4,633,628 | 1/1987 | Mostaghel | 52/167.7 |
| 5,201,155 | 4/1993 | Shimoda et al. | 52/167.7 |
| 5,372,156 | 12/1994 | Luz et al. | 267/140.2 |

FOREIGN PATENT DOCUMENTS

| | | | |
|---|---|---|---|
| 59-23139 | 2/1984 | Japan | 248/566 |
| 3-257237 | 11/1991 | Japan | 52/167.7 |

*Primary Examiner*—Lee W. Young
*Attorney, Agent, or Firm*—Hovey, Williams, Timmons & Collins

[57] ABSTRACT

An energy absorber for interposing between two members to absorb energy of motion which may be induced between the two members includes a core (3) of a plastically deformable energy absorbing material such as lead and structure surrounding the core such as layers of steel plates (2) and rubber (1) in a sandwich-like arrangement structure. The end plates (4) are formed with holes (5), into which the ends of the core (3) project. During construction, the support structure (1, 2) is stretched, allowing end caps (6) to be fitted. The support structure (1, 2) is then relaxed, which applies approximately hydrostatic pressure to the core (3). Induced motion is transferred as shear forces across the core (3). The hydrostatic pressure applied to the core (3) preferably exceeds the shear yield stress of the energy absorbing material of the core (3).

30 Claims, 10 Drawing Sheets

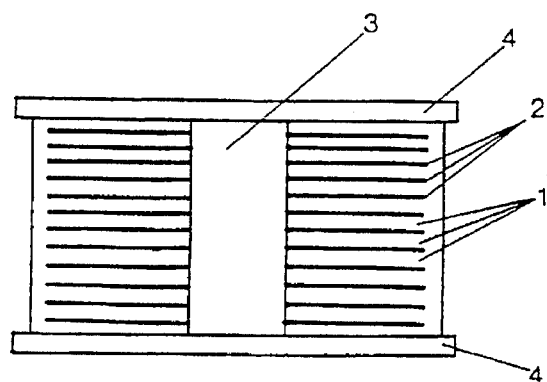
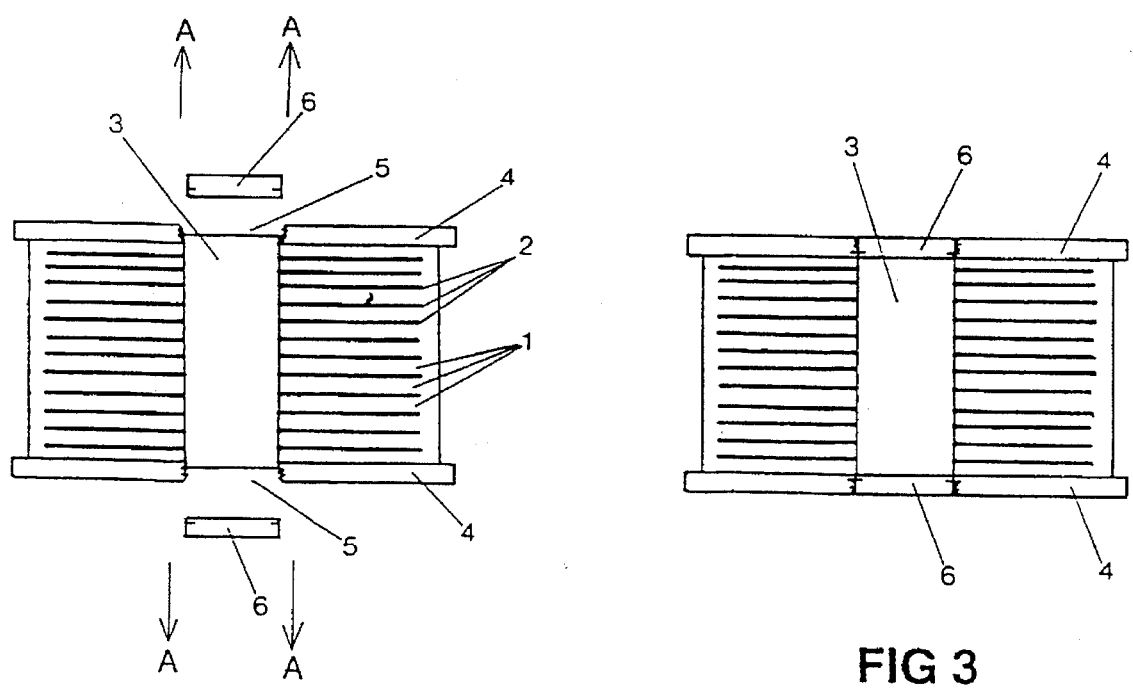

HYDROSTATIC PRESSURE = 0

HYDROSTATIC PRESSURE = $\sigma'_{xy}$

ENERGY ABSORBERS AND METHODS OF MANUFACTURE

FIELD OF THE INVENTION

This invention relates to energy absorbers used for reducing the effects of induced motion or displacement in variety of structures and equipment and methods for their manufacture.

The energy absorbers of the invention may be used in large structures such as buildings or bridges to reduce the effects of motion induced during earthquakes or from strong winds. They may also be used as shock absorbers or energy absorbing stops for halting railway wagons or other moving objects. They may also be used to damp vibration from industrial machinery or engines or the like or from domestic appliances such as washing machines for example, or in any other application where it is desired to isolate from or damp any motion, vibrations or similar. The energy absorbers of the invention have various applications.

BACKGROUND OF THE INVENTION

Energy absorbers which employ elastic or plastic deformation of certain materials to absorb energy are well known. U.S. Pat. Nos. 4,117,637, 4,499,694 and 4,593,502 describe forms of cyclic shear energy absorbers which in seismic isolation applications are typically interposed between two vertically contiguous weight holding members of a structure, such as between the piles and a base floor of a medium size building or between the foundation blocks and upright supports in a bridge. Typically around fifty to one hundred such energy absorbers are used in a building in the form of bearings in the building foundations to seismically isolate the building. A general discussion of these and related devices is given in "An Introduction to Seismic Isolation", R. I. Skinner, W. H. Robinson and G. H. McVerry, Wiley, 1993.

Such bearings used for seismic isolation for example typically comprise a resilient support pad which takes a portion of the weight of the structure and an energy absorbing core comprising a material which deforms plastically as the structure sways relative to the ground. The support pad typically comprises alternating layers of an elastic material such as rubber and plates of a relatively stiff material such as steel bonded together. The energy absorbing core is typically formed of lead. The bearing may be fixed between connector plates which are in turn connected to the building structure members above and below. Alternatively the bearing may simply be fitted into a recess or equivalent on each building structure member. Such energy absorbers are commonly known as lead-rubber bearings.

Lead is the preferred material for forming the energy absorbing core for several reasons. First it yields at a room temperature shear stress of around 10.5 MPa which is low compared with other metals and equivalent plastic materials. Second it restores its mechanical properties through recrystallisation and associated processes relatively rapidly following yield deformations, which provides outstanding resistance to work hardening under cyclic shear at ordinary temperatures. Third lead is readily available at the purity required to exhibit these properties.

SUMMARY OF THE INVENTION

It is an object of the present invention to provide for improved performance of such energy absorbers for seismic isolation and other applications.

The invention broadly comprises an energy absorber for interposing between two members to absorb energy of motion which may be induced between the two, comprising a core of a plastically deformable energy absorbing material and means surrounding the core which applies approximately hydrostatic pressure at least approaching the shear yield stress of the energy absorbing material to the core and transfers motion between said members as shear forces across the core.

Preferably the hydrostatic pressure applied to the core exceeds the shear yield stress of the energy absorbing material. Preferably the hydrostatic pressure is 10 MPa or more and most preferably in the range 20–100 MPa.

Preferably the energy absorbing material of the energy absorber core is lead, but other energy absorbing materials which may be used include alloys of lead, aluminium at elevated temperature e.g. about 200° C., tin, zinc, brass, iron, super plastic alloys, or any other material having a low rate of work hardening, including also densely packed granular materials such as steel shot, glass beads, alumina, silica, silicon carbide or any other very hard granular material.

Preferably the means surrounding the core includes plates surrounding the core which can move relative to one another across the core during induced motion to apply shear forces to the core. The plates may or may not be separated by layers of an elastic material. For example, the plates may be separated by layers of rubber between the plates to form a unitary structure surrounding the core. Alternatively a structure surrounding the core may comprise a stack of plates which can slide somewhat relative to one another—some or all of the plates may be coated with a material such as Teflon or any other suitable coating material to assist movement of the plates or to protect the plates from becoming locked together by corrosion over time for example.

The core may be of constant or varying diameter over the height of the core. The plates surrounding the core may in turn be surrounded by a second set of plates at for example a greater spacing between plates and which may also for example also be separated by layers of elastic material between adjacent plates. In such a case an energy absorber insert or unit comprising a core surrounded by the first set of plates may be manufactured separately from a pad comprising a second set of plates separated by layers of elastic material and having an internal cavity into which the separately manufactured energy absorber unit is inserted at a later stage. The energy absorber insert may be completely embedded within the larger pad comprising the second set of plates and elastic layers.

Energy absorbers of the invention may be used in seismic isolation applications to isolate large structures such as buildings or bridges from seismic motion or very strong wind buffeting or similar. They may also be used in any other application where it is desired to isolate from or damp any motion, vibrations, or similar. For example, energy absorbers of the invention may be formed as mounting pads for engines or any other industrial machinery. In domestic applications, energy absorbers of the invention may be used in washing machines or spin dryers or dish washers to isolate vibrations. Small size energy absorbers of the invention may be used as "microisolators" for sensitive electronic equipment such as the mechanism of a video recorder etc or in other similar applications. Numerous applications of the energy absorbers of the invention are envisaged and the invention is not limited only to seismic isolation energy absorbers.

The invention also comprises a method of manufacturing an energy absorber for interposing between two members to absorb energy of motion which may be induced between the two comprising a core of a plastically deformable energy absorbing material and means surrounding the core which transfers motion between said members as shear forces across the core, including the step of applying approximately hydrostatic pressure at least approaching the shear yield stress of the energy absorber material to the core.

BRIEF DESCRIPTION OF THE DRAWINGS

Preferred embodiments of the invention will be described by way of example with reference to the following drawings, wherein:

FIG. 1 shows a typical conventional lead-rubber energy absorber bearing in cross-section, FIG. 2 shows a first preferred form energy absorber of the invention in cross-section and partly disassembled, FIG. 3 shows the energy absorber of FIG. 2 in cross-section and assembled.

DESCRIPTION OF PREFERRED EMBODIMENTS

Figure 4:
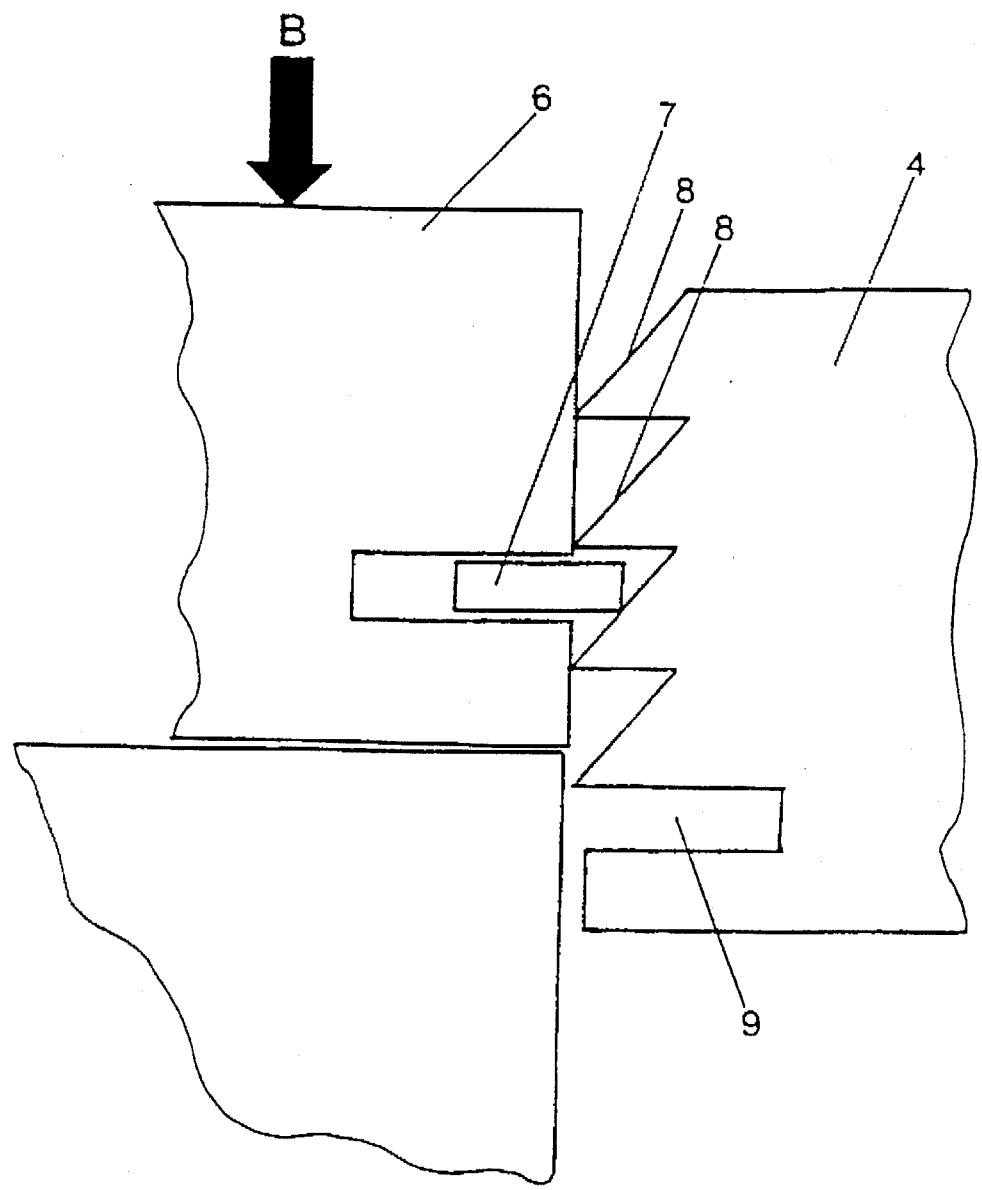
FIG. 4 shows detail of fixing into position of the end cap of the energy absorber of FIGS. 2–3.

FIG. 1 shows a typical known energy absorber comprising a lead-rubber bearing in cross-section, such as described in U.S. Pat. No. 4,117,637 for example. The bearing comprises a resilient support pad 10 comprising alternating rubber layers 1 interleaved with layers 2 of steel plates in a sandwich-like structure. The bearing comprises an energy absorbing core 3 of lead. The bearing comprises optional connector plates 4 on the top and bottom to enable the bearing to be fixed in position by bolting through the connector plates 4, to structural members of a building, bridge or similar in a seismic isolation application for example. Alternative to the connector plates 4 or equivalent the members of the structure between which the bearing is interposed may be provided with shallow recesses into which the bearing engages to prevent horizontal movement. In use, when the bearing is deformed horizontally for example in an earthquake or under wind loading, the bearing is subjected to forces including shear forces. Shear forces are applied to the core 3. As the bearing is subjected to motion the core is repeatedly deformed back and forth.

FIGS. 2 and 3 show a first preferred form energy absorber of the invention. The energy absorber is in overall construction generally similar to that of FIG. 1 and comprises an energy absorbing core 3 and means surrounding the core which transfers motion across the core in the form of plates 2 with layers 1 of an elastic material between adjacent plates. The elastic material may be natural or synthetic rubber or a rubber composite or any other suitable elastic material. The plates may be formed of a metal such as preferably steel or any other hard metal, carbon fibre or the like. The energy absorber also has connector or end plates 4. Rubber sheets and steel plates may be bonded together to form the layered steel-rubber structure surrounding the core 3 by vulcanising the rubber or through adhesives or solder in some cases. The hole for the lead core may be preformed in the individual layers beforehand or machined through the assembled structure afterwards. The core may be cast directly into the hole or alternatively pressed in as a tight fitting plug, as will be further described. In this form the core is cylindrical but the core may be of any other desired shape, while the overall shape of the energy absorber including the structure about the core may be cylindrical, square, rectangular or any other desired shape.

In the absorber of the invention shown in FIGS. 2 and 3 the core 3 is slightly longer than the surrounding support structure is thick, and when the support structure comprising the elastic layers is relaxed the core extends into holes 5 in the end plates 4. During manufacture the support structure is stretched approximately perpendicular to the plates as indicated by arrows A until the length of the core 3 has been accommodated. End caps 6 are then fixed in place in the holes 5 at each end of the core 3, and the stretching force is released. FIG. 2 shows the end caps 6 removed and FIG. 3 shows them in place. When the pad is released hydrostatic pressure is applied to the core 3 by way of elastic retraction in the elastic layers 1. The pressure is approximately hydrostatic in that forces per unit area of core surface due to vertical and horizontal deformation of a pad are approximately equal.

Figure 26:
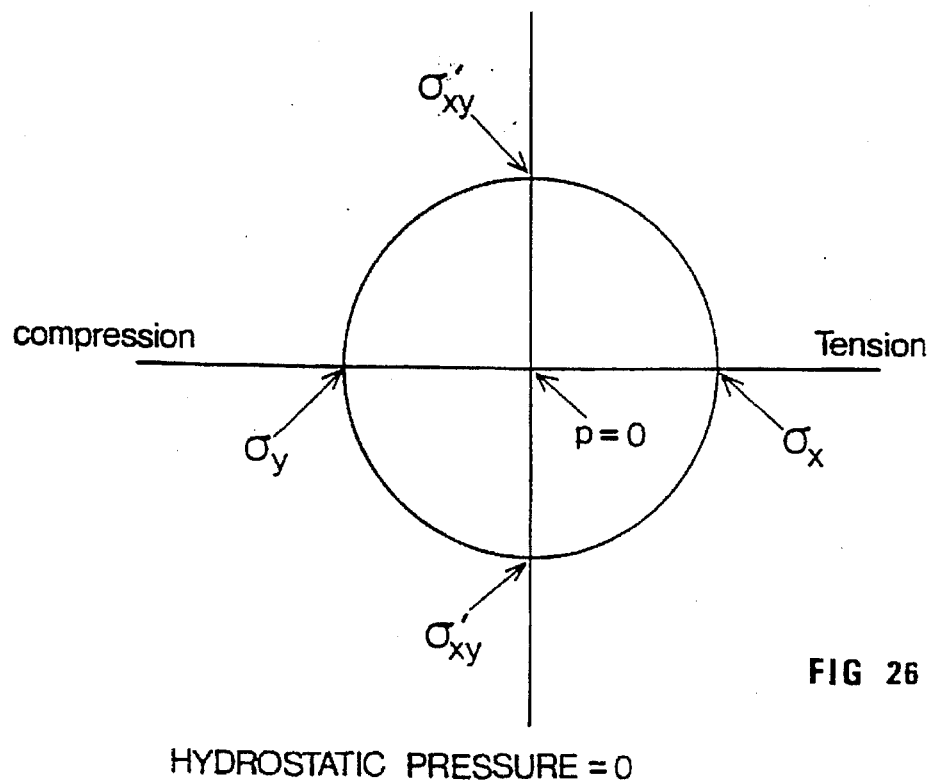
FIGS. 26 and 27 are Mohr circle constructions which will be referred to further in description of energy absorbers of the invention.
Figure 27:
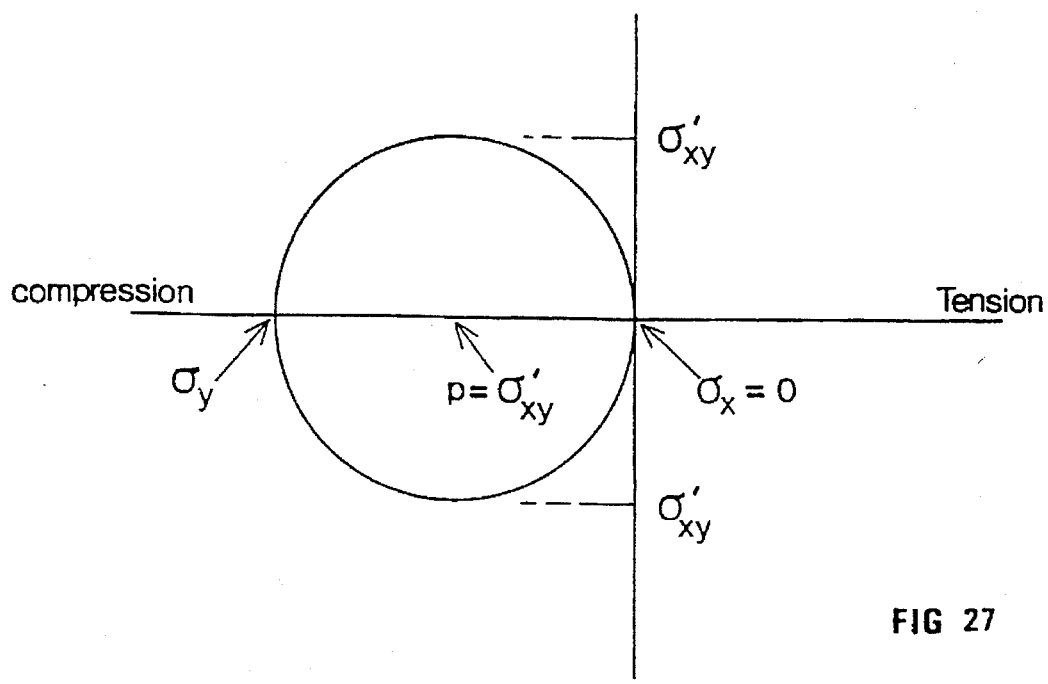

The core material is prestressed under an approximately hydrostatic pressure at least approaching and preferably exceeding the shear yield stress of the energy absorbing material of the core so that the core material will generally always be in compression. With lead the yield shear stress at ambient temperature is about 10.5 MPa and pressures of 10 MPa or more have been found effective. The effect of the hydrostatic pressure may be explained briefly by way of the Mohr circle constructions shown in FIGS. 26 and 27, which enables the property tensor description of stress to be represented in two dimensions. A hydrostatic pressure applied to a body is then defined as one third the sum of the three principal stresses which act upon it. In FIG. 26 the hydrostatic pressure is zero, and the principal tensile stress $\sigma_x$, the principal compressive stress $\sigma_y$ and the maximum shear stresses $\sigma'_{xy}$ are all equal in magnitude. In FIG. 27 a hydrostatic pressure P equal to the shear stress $\sigma'_{xy}$ has been applied. The maximum tensile stress is then zero so that the body is always under compression. Therefore the body cannot fail in tension.

FIG. 4 shows one arrangement for fixing the end caps 6 but any other suitable arrangement can be used. In FIG. 4 the periphery of the hole 5 in the end plate 4 (the top hole is shown—bottom is the reverse) is stepped as shown so that circlip 7 retained about the end cap 6 slides on consecutive slant surfaces 8 when the cap 6 is forced inwards in the direction of arrow B (while stretching the energy absorber in the direction of arrows A in FIG. 2 as previously described) until the circlip 7 engages into groove 9 to hold the cap in place. Between each step the cap may be paused so that the pad may be treated with say, another stage of a vulcanisation process before full pressure is applied to the core. Multiple circlips may be provided on each cap. When the caps are in place the entire unit may for example be encased in rubber or similar and further vulcanised.

Figure 5:
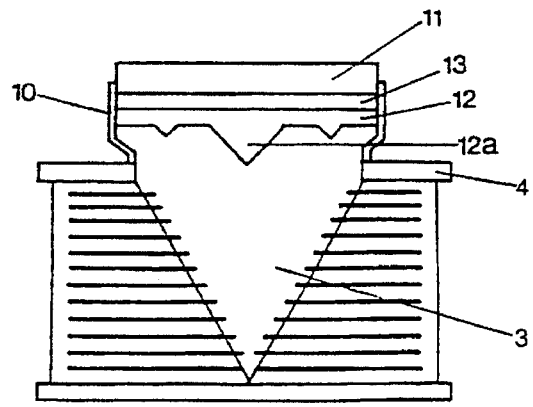
FIG. 5 shows a second preferred form energy absorber of the invention, having a conically shaped core.

FIG. 5 shows another preferred form of energy absorber of the invention again comprising a core 3 and means surrounding the core consisting of a sandwich-like structure of plates 2 and layers 1 of an elastic material between adjacent rigid plates. In this embodiment the core 3 is of a generally conical shape as shown. The core may be formed of lead cast or extruded under high pressure into place. Preferably in this and other energy absorbers of the invention, the edges of the plates extend slightly into the core cavity e.g. by a few millimeters or so, and into the material of the core. When the core 3 is cast in place the lead material will flow between the plate edges. When the core is extruded or pressed into place under force the preferably heated lead will also "flow" about the protruding plate edges.

The energy absorber of FIG. 5 may be used as a seismic isolation bearing and use the weight of the structure which the bearing supports to apply the hydrostatic pressure to the energy absorber core 3. A generally cylindrical end piece 10 formed for example of steel is fixed to the top end plate 4 of the bearing for example by being integral with top plate 4 about the hole into the cavity containing the core 3. The end piece 10 is preferably of enlarged diameter relative to the diameter of the hole in the end plate 4 as shown, but could be of the same or a lesser diameter. Within the hollow end piece 10 is mounted an end cap 11 which bears on the core 3. The top surface of the end cap protrudes above the sides of the end piece 10 and carries at least part of the weight of the structure above the bearing. The weight of the structure transfers force onto the end of the core 3 creating the required hydrostatic pressure. The end cap 11 may act on the core 3 through a piston 12 having a profiled under-surface 12a to ensure good contact and force transfer on to the top of the core 3. A rubber transfer component 13 may be interposed between the end cap 11 and piston 12.

Figure 6:
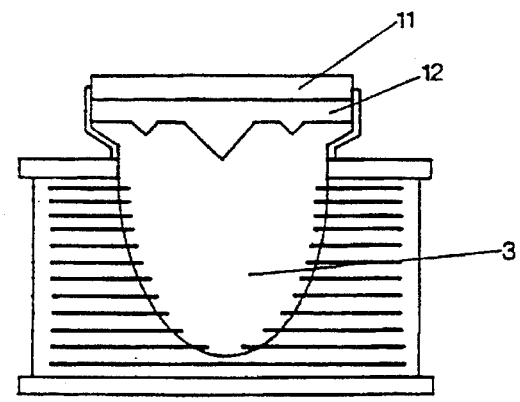
FIG. 6 shows a third preferred form energy absorber of the invention, having an paraboloid shaped core.

The form of energy absorber of the invention of FIG. 6 is very similar to that of FIG. 5 except that the energy absorbing core 3 is paraboloid in shape. Still other shapes of energy absorbing core are possible within the invention, as will be further described. In the energy absorber of FIG. 6 the core does not extend to the bottom of the steel plates— elastic layers structure which surrounds the core. This reduces the initial stiffness of the energy absorber so that for example in a seismic isolation application mild earthquakes or strong winds which do not generate forces sufficiently strong to deform the lead core 3 will still be accommodated by flexing of that part of the pad beneath the end of the lead core. A building, bridge etc will be reasonably isolated against such mild earthquakes or strong winds or similar. Any energy absorber of the invention may be similarly designed.

Figure 7:
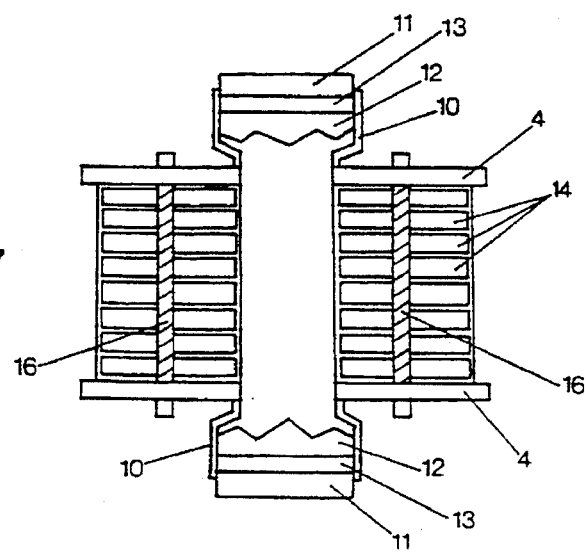
FIG. 7 shows a fourth preferred form energy absorber of the invention in cross-section.

FIG. 7 shows another preferred form energy absorber of the invention in this case having a cylindrical core. Force is transferred to the core 3 at either end of the core again by way of end caps 11 mounted in end pieces 10 through pistons 12 and intermediate resilient transfer components 13. In this embodiment the means surrounding the core which transfers motion as shear forces across the core consists of a stack of plates 14, which as for the plates 2 of the energy absorbers of figures previously described may be formed of steel or any other suitable material. Alternate plates of the stack or all of the plates of the stack may be coated with Teflon or a similar material to reduce friction between the plates and/or to protect the plates from corrosion. Motion imparted to the bearing will cause the plates of the stack to slide relative to one another to apply shear forces across the core to absorb energy as before. Metal pins 16 may also pass through holes in the plates 14 and the end plates 4 as shown to ensure the lead core deforms in a uniform manner.

In FIGS. 5 to 7 the arrangement of the end pieces 10, end caps 11, pistons 12 and resilient component 13 is shown enlarged for clarity in the drawings and is not shown to scale relative to the rest of the energy absorber.

Figure 8:
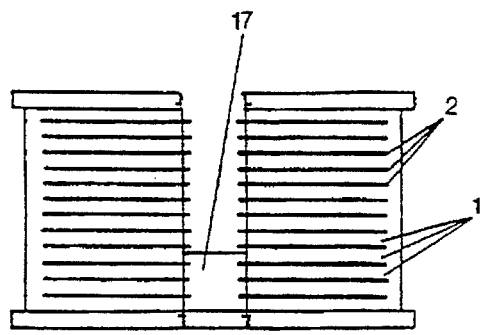
FIG. 8 shows a fifth preferred form energy absorber of the invention similar to that of FIGS. 2 and 3, comprising a core constructed by separately inserting segments of energy absorbing material and pressing them into place, showing two such segments pressed into place.
Figure 9:
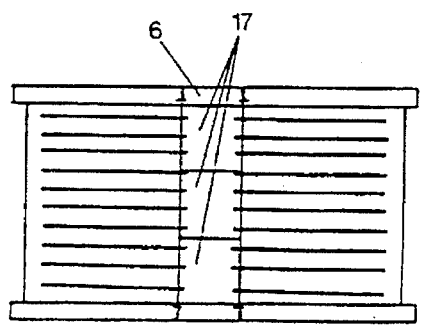
FIG. 9 shows the energy absorber of FIG. 8 with all segments pressed into place and both end caps of the energy absorber fitted.

FIGS. 8 and 9 illustrate one way of inserting the lead core 3 into an energy absorber of the invention, alternative to pressing a solid one piece core into place as in FIGS. 2 and 3. The core may be formed of individual segments which are pressed into place as shown. FIG. 8 shows two segments 17 pressed into place while FIG. 9 shows the completed core composed of a number of lead segments 17 tightly pressed together. As part of the operations pressing each segment into place, sufficient force is applied to cause the lead of the segment 17 to extrude between the protruding plate edges as described previously. During pressing of the segments into place the structure of plates 2 and elastic layers 1 may be extended as described in relation to FIGS. 2 and 3 and the last end cap 6 fitted and the stretching force then released so that the hydrostatic force will then be applied to the energy absorber core.

Figure 10:
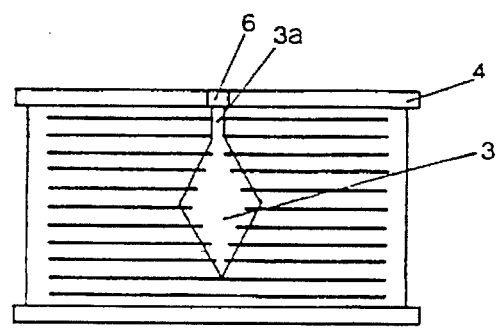
FIG. 10 shows a sixth preferred form energy absorber of the invention having a bi-pyrimidal shaped core.
Figure 11:
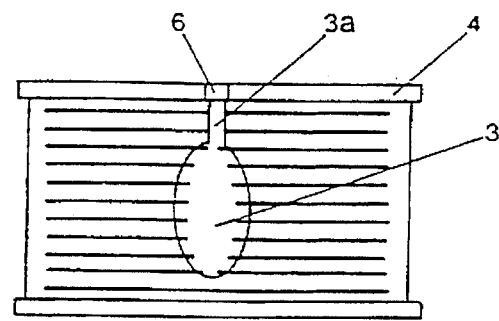
FIG. 11 shows a seventh preferred form energy absorber of the invention having an ovoloid shaped core.

FIGS. 10 and 11 show energy absorbers of the invention having bi-pyrimidal and paraboloid shaped cores 3 respectively. In both cases a port 3a communicates the core cavity to a hole in the end plate 4 normally closed by an end cap 6. The end cap 6 may be held in position by an arrangement of circlips as described in relation to FIGS. 2 to 4, or by any other suitable arrangement. To manufacture the energy absorber the surrounding support structure is elastically stretched as previously described, and melted or heated lead is poured or forced under pressure through port 3a to fill the core cavity to form the energy absorbing core 3. The end cap 6 is then fitted into place, and the stretching force released so that the hydrostatic pressure will be applied to the core by elastic retraction of the layers of elastic material of the pad. Preferably the end cap 6 acts through a piston and resilient component between the end cap 6 and the piston, in a similar arrangement to the end cap 11, resilient component 13, and piston 12 of FIGS. 5 and 7.

Figure 12:
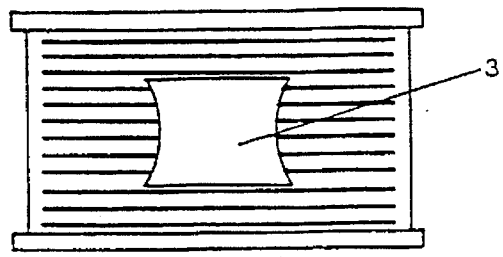
FIG. 12 shows an eighth preferred form energy absorber of the invention having a core which has a greater diameter towards the ends of the core.
Figure 13:
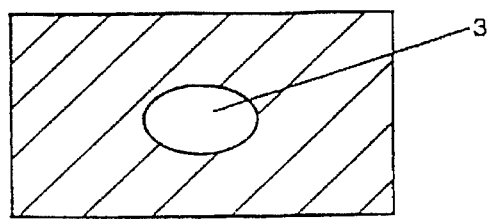
FIG. 13 shows an energy absorber such as that of FIG. 12 in horizontal cross-section.

FIG. 12 shows an energy absorber of the invention having a core the diameter of which increases towards the ends of the core. This may be advantageous to reduce creep and/or to generally affect the stiffness or lifetime of the core. As shown the core need not extend the full height of the surrounding structure. Such a core, or a core of constant diameter or other shape may be elliptically shaped in plan view for example, as shown in FIG. 13.

Figure 14:
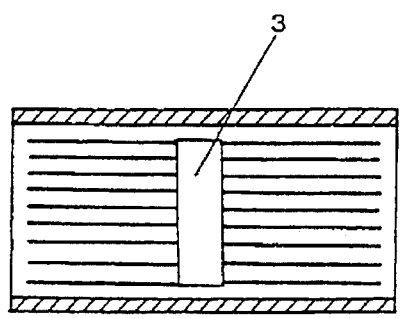
FIG. 14 shows a ninth preferred form energy absorber of the invention.
Figure 15:
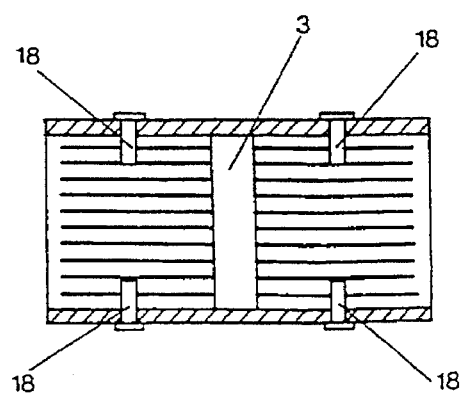
FIG. 15 shows a tenth preferred form energy absorber of the invention.

In the energy absorber of the invention of FIG. 14 the core is bonded to end plates 4 by vulcanisation or adhesive or similar. In the energy absorber of FIG. 15 the end plates are fixed in position by bolts 18 which on tightening may assist in providing or maintaining the hydrostatic pressure required on the core.

Figure 16:
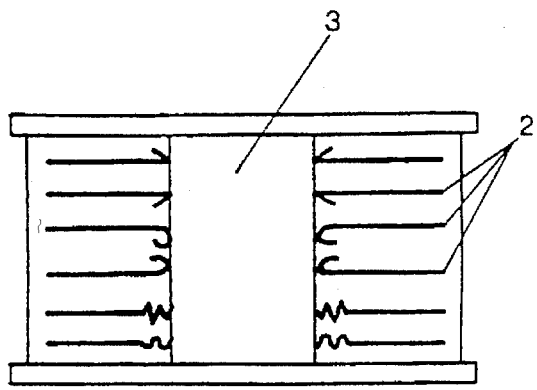
FIG. 16 shows an eleventh preferred form energy absorber of the invention wherein inner edges of plates of the energy absorber surrounding the cavity containing the core are enlarged.

In the energy absorber of FIG. 16 the plates 2 of the plate—elastic layers structure surrounding the core have enlarged inner rims as shown. A variety of rim shapes are possible as shown, and the enlargement enhances interaction between the pad and core so that shear forces are spread more uniformly throughout the energy absorber.

Figure 17:
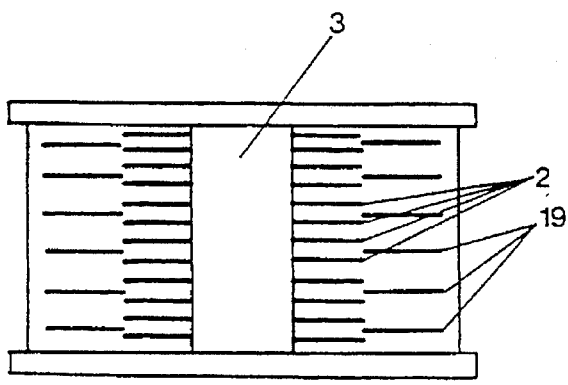
FIG. 17 shows a twelfth preferred form energy absorber of the invention comprising a first structure of plates embedded in elastic material surrounding the core and a set structure of plates embedded in elastic material surrounding the first such structure.
Figure 18:
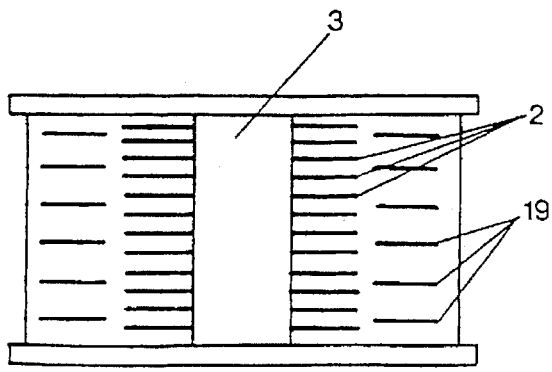
FIG. 18 shows a thirteenth preferred form energy absorber of the invention similar to that of FIG. 17 with greater spacing between the first and second structures of plates and elastic material.

FIGS. 17 and 18 show energy absorbers of the invention similar to those previously described wherein the core is surrounded by a sandwich-like structure consisting of rigid plates with layers of an elastic material such as rubber between adjacent plates. However, in the energy absorbers of FIGS. 17 and 18 the core is surrounded by a first structure of plates 2 and bonded elastic layers which in turn is surrounded by a second structure of plates 19 and bonded elastic layers. The plates 19 may be spaced further apart from each other as shown than the plates 2, and may extend right to the first set of plates 2 or even interleave with the first set of plates, or may be spaced from the plates 2 when viewed in cross-section by a region of elastic material as shown in FIG. 18. All of the plates 2 and 19 are embedded within the elastic material as shown.

Figure 19:
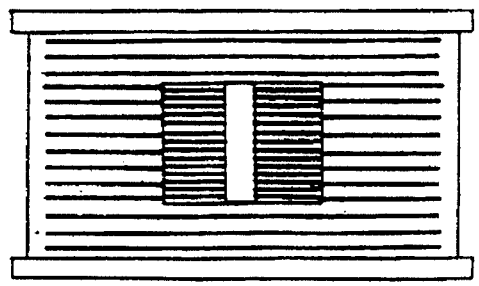
FIG. 19 shows a fourteenth preferred form energy absorber of the invention comprising a first structure of plates and elastic layers surrounding the core and a second structure of plates wherein the core and first plate—elastic material structure is embedded within the second such structure as an insert.
Figure 20:
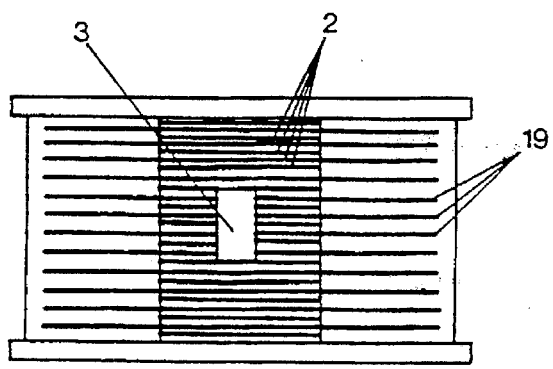
FIG. 20 shows a fifteenth preferred form energy absorber of the invention similar to that of FIG. 19 but wherein the insert comprising the core and first set of plates separated by layers of elastic material extends the full height of the second plates—elastic layers structure.
Figure 21:
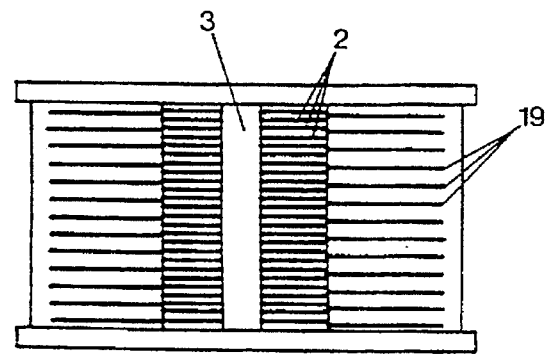
FIG. 21 shows a sixteenth preferred form energy absorber of the invention similar to that of FIG. 20 where the core extends the full height of the first and second set of plates—elastic material structure.
Figure 22:
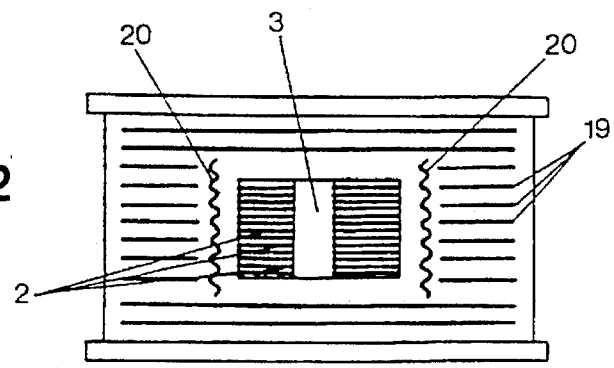
FIG. 22 shows a seventeenth preferred form energy absorber of the invention wherein an insert comprising the core and first structure of plates separated by layers of elastic material is surrounded by vertical plates between it and the adjacent second structure of plates and elastic layers.

FIGS. 19, 20, 21 and 22 show similar energy absorbers of the invention wherein the core is surrounded by a first plates—elastic layers structure which is in turn surrounded by a second similar structure. Again, the plates 19 may be more widely spaced than the plates 2. The energy absorbing core 3 surrounded by the first structure of plates 2 with interleaved layers of elastic material bonded to the plates may comprise only part of the height of the second set of plates with elastic material between the second set of plates as shown in FIG. 19, or the full height as shown in FIG. 20. Also, the energy absorbing core 3 may comprise only part of the height of the first plates—elastic layers structure as shown in FIG. 20 or the full height as shown in FIG. 21. FIG. 22 shows an energy absorber of this type wherein further plates 20 which extend vertically are placed between the insert and the second surrounding structure.

In the energy absorbers of FIGS. 19 to 22 the unit comprising the core 3 surrounded by the plates 2 and elastic layers 1 or equivalent may be considered an energy absorber insert. It may be manufactured separately from a unit comprising the plates 19 and layers of elastic material. In the case of the embodiments of FIGS. 20 and 21 the two units may be separately produced and the smaller unit may then be inserted home within the larger unit comprising the plates 19. In the embodiments of FIGS. 19 and 22 the smaller unit insert may be formed first and then the balance of the total structure shown formed about it so that the insert becomes embedded.

Figure 23:
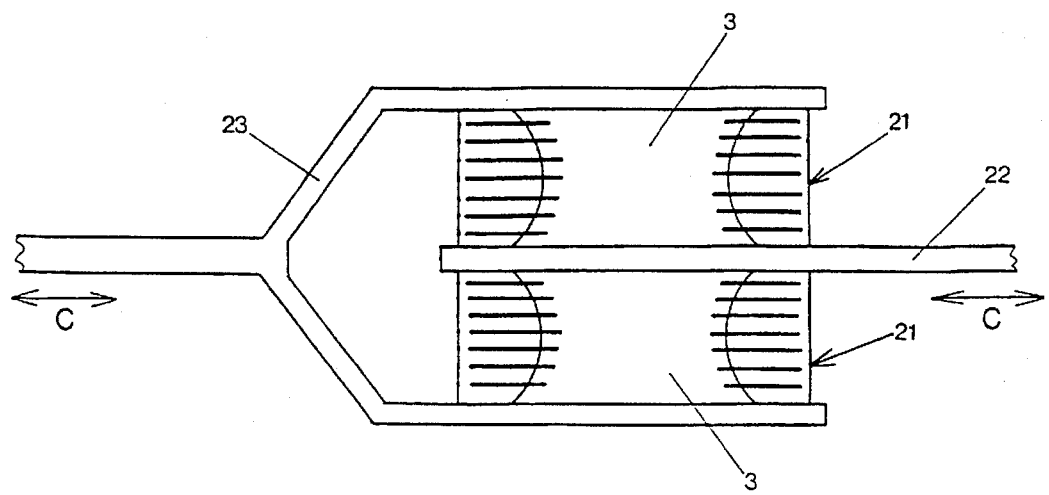
FIG. 23 shows in cross-section two energy absorbers of the invention arranged for absorbing longitudinal motion along a strut or similar from wind loading for example.

FIG. 23 shows an energy absorber of the invention having a core 3 of increasing diameter towards either end of the core. In this case two such energy absorbers 21 are shown configured for absorbing motion along a strut from wind loading or for bracing against interfloor movement in a building structure for example. The dampers 21 are fixed to a connecting member 22 on one side and a yoke connecting member 23 on the other so that forces applied in the direction of the arrows C will be damped.

Figure 24:
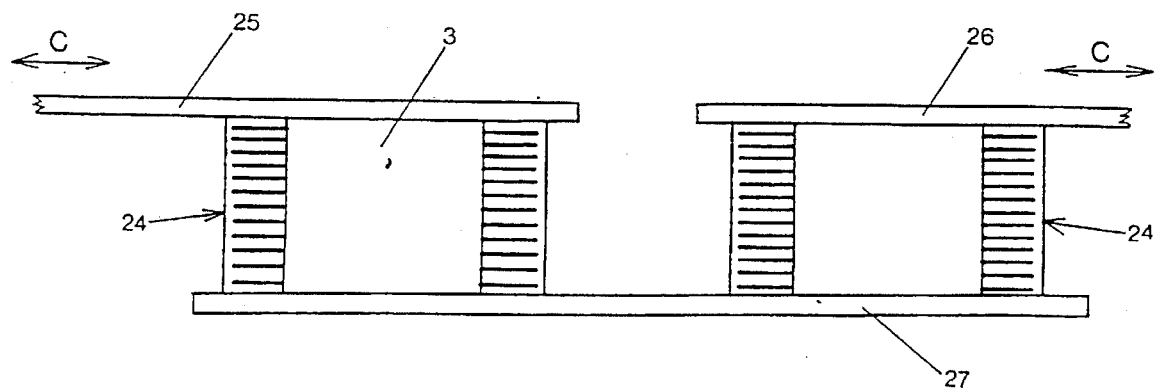
FIG. 24 shows a further arrangement of two energy absorbers also arranged to absorb longitudinal motion along a strut or similar, FIG. 25 shows a test rig for testing energy absorbers of the invention.

FIG. 24 shows two energy absorbers 24 of the invention similarly connected to strut members 25 and 26 and member 27 for absorbing forces in the direction of the arrows C as shown.

Figure 25:
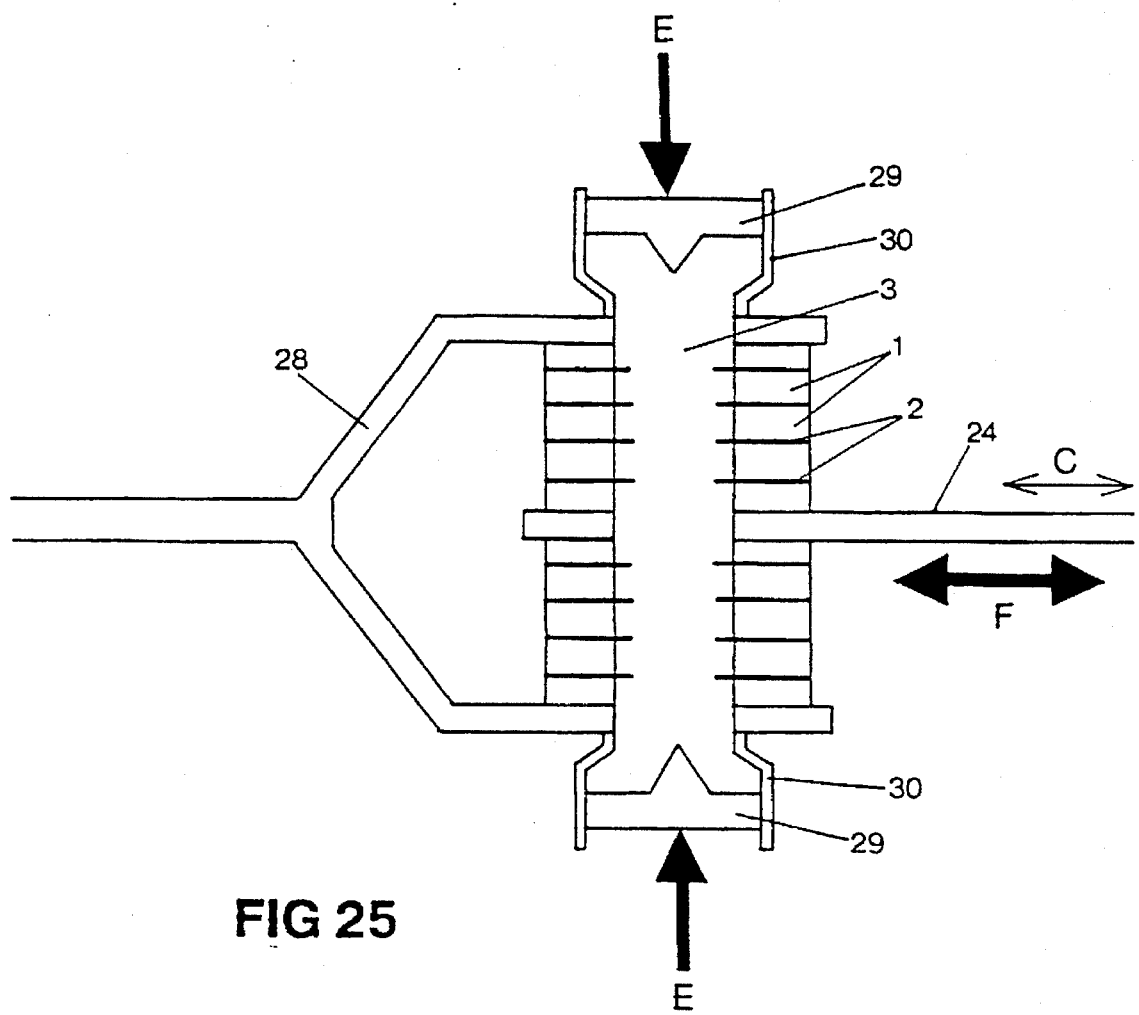

FIG. 25 shows a test rig for testing energy absorbers of the invention. An energy absorber as previously described comprising a core 3 is shown on the test rig. Yoke 28 holds either end of the energy absorber fixed. Hydrostatic pressure is applied to the lead core of the energy absorber through pistons 29 mounted within end pieces 30 similar to as previously described in relation to FIGS. 5 to 7. Pressure may be applied to the pistons 29 through hydraulic rams for example (not shown) as indicated by arrows E. Arm 31 attached to the centre of the energy absorber reciprocates in the direction of arrow F as shown during testing. The frequency and amplitude of reciprocation may be varied. Reciprocation my be driven by again a reciprocating hydraulic ram for example.

Energy absorbers of the invention have been shown to have a substantially increased working life with at degradation of the energy absorbing material. The following description of test results further illustrates the invention:

TEST 1

Energy absorbers consisting of 14 evenly spaced plates of hardened steel of dimensions 90 mm×76 mm and thickness 2.5 mm separated by layers of rubber 1.6 mm thick bonded between the plates were mounted on a test rig as illustrated in FIG. 25. The core cavity was comprised of concentric holes 30 mm in diameter in the steel layers and 32 mm in diameter in the rubber layers. The core comprised 99.9% purity lead. The test rig subjected the energy absorber to horizontal displacement cycles of amplitude ±5 mm with a force of 22 kN at a frequency of 2 cycles/minute. Hydraulic rams were operated on either end of the lead core during testing to apply hydrostatic pressure to the lead core of approximately 60 MPa. After 20,000 testing cycles the damping force and energy absorbed per cycle were still within 20% of the starting values. After 20,000 cycles the energy absorber was removed from the test rig and sawn in half. The core lead was visually inspected and found to be in good condition.

TEST 2

An energy absorber pad identical to that of test 1 was tested in the same way except that hydrostatic pressure was not applied to the lead core by the test rig. After less than 100 test cycles the damping force and energy absorbed per cycle were less than 50% of the starting values.

TEST 3

An energy absorber was constructed consisting of 22 steel plates of dimensions 90 mm×50 mm and thickness 2.75 mm. Every second plate was coated with Teflon. The core consisted of a cylindrical lead plug of 30 mm diameter. The energy absorber was tested on a test rig as illustrated in FIG. 25 under the same test conditions as in Test 1 above. After 5,000 cycles the damping force and energy absorbed were still within 20% of the starting values.

The foregoing describes the invention including various preferred forms thereof. Alterations and modifications as will be obvious to those skilled in the art are intended to be incorporated herein as defined in the claims.

I claim:

1. An energy absorber for interposing between two members to absorb energy of motion which may be induced between the two members, comprising a core of a plastically deformable energy absorbing material and means surrounding the core which applies approximately hydrostatic pressure at least approaching the shear yield stress of the energy absorbing material to the core and which during such induced motion transfers motion between said members as shear forces across the core.

2. An energy absorber according to claim 1 wherein hydrostatic pressure exceeding the shear yield stress of the energy absorbing material is applied to the core.

3. An energy absorber according to claim 2 wherein hydrostatic pressure of 10MPa or more is applied to the core.

4. An energy absorber according to claim 3, wherein hydrostatic pressure exceeding 20 MPa is applied to the core.

5. An energy absorber according to claim 1, wherein the core is formed of lead.

6. An energy absorber according to claim 1, wherein the means surrounding the core includes plates surrounding the core which can move relative to one another across the core during said induced motion to apply shear forces to the core.

7. An energy absorber according to claim 6, wherein the means surrounding the core also comprises layers of an elastic material extending between adjacent plates of said plates surrounding the core and fixed to said plates forming a unitary structure surrounding the core.

8. An energy absorber according to claim 7, wherein the means surrounding the core which applies hydrostatic pressure to the core also includes at least one end cap fixed to the energy absorber and drawn to bear against the core by elastic retraction of the means surrounding the core which is extended during manufacture of the energy absorber.

9. An energy absorber according to claim 6, wherein the means surrounding the core which applies hydrostatic pressure to the core includes at least one end cap adapted to carry weight of a structure carried by the energy absorber to cause the end cap to bear against the core to apply said hydrostatic pressure.

10. An energy absorber according to claim 9, wherein the end cap bears on the core through a piston between the end cap and the core.

11. An energy absorber according to claim 10, including a component of resilient material between the end cap and the piston.

12. An energy absorber as claimed in claim 1, wherein the core is of varying diameter over the height of the core.

13. An energy absorber as claimed in claim 7, wherein the unitary structure of said plates and layers of elastic material surrounding the core is surrounded by a second structure of plates and layers of elastic material extending between adjacent plates and fixed to the plates with a greater spacing between plates.

14. An energy absorber for interposing between two members to absorb energy of motion which may be induced between the two members, comprising a core of a plastically deformable energy absorbing material, a unitary structure surrounding the core comprising a series of spaced parallel plates with layers of an elastic material extending between the plates and fixed to the plates with the core being subject to approximately hydrostatic pressure at least approaching the shear yield stress of the energy absorbing material by elastic retraction of the layers of elastic material between the plates which are extended during manufacture of the energy absorber.

15. An energy absorber according to claim 14, wherein the core is formed of lead.

16. An energy absorber as claimed in claim 15, wherein the core is subject to hydrostatic pressure substantially exceeding the shear yield stress of the lead.

17. An energy absorber for interposing between two members to absorb energy of motion which may be induced between the two members, comprising a core of a plastically deformable energy absorbing material, a unitary structure surrounding the core comprising a series of spaced parallel first plates with layers of an elastic material bonded between the first plates with the core being subject to approximately hydrostatic pressure at least approaching the shear yield stress of the energy absorbing material by elastic retraction of the layers of said unitary structure which are extended during manufacture of the energy absorber, and a second structure surrounding said unitary structure, said second structure comprising a series of spaced parallel second plates and elastic material extending between and bonded to said second plates with a greater spacing between said second plates than between said first plates.

18. An energy absorber according to claim 17, wherein the core is formed of lead.

19. An energy absorber as claimed in claim 18, wherein the core is subject to hydrostatic pressure substantially exceeding the shear yield stress of the energy absorbing material of the core.

20. A method of manufacturing an energy absorber for interposing between two members to absorb energy of motion which may be induced between the two members comprising a core of a plastically deformable energy absorbing material and means surrounding the core which transfers motion between said members as shear forces across the core, the method including the step of applying approximately hydrostatic pressure at least approaching the shear yield stress of the energy absorber material to the core.

21. A method according to claim 20 including applying hydrostatic pressure exceeding the shear yield stress of the energy absorbing material to the core.

22. A method according to claim 21 including applying hydrostatic pressure of 10 MPa or more to the core.

23. A method according to claim 21 including applying hydrostatic pressure exceeding 20 MPa to the core.

24. A method according to claim 21 including forming the core of lead.

25. A method of manufacturing an energy absorber for interposing between two members to absorb energy of motion which may be induced between the two members, comprising forming a unitary structure comprising a number of plates separated by layers of an elastic material extending between adjacent plates and fixed to the plates and comprising a hollow cavity through the plates and layers of elastic material between the plates, applying a stretching force to stretch said unitary structure to slightly expand said cavity, filling said cavity with a plastically deformable energy absorbing material through an opening through the unitary structure into said cavity to form a core of the energy absorber, fitting an end cap to close said opening, and removing said stretching force to allow the unitary structure to retract and apply a hydrostatic pressure to the core.

26. A method according to claim 25, wherein the hydrostatic pressure exceeds the shear yield stress of the energy absorbing material of the core.

27. A method according to claim 26, including filling the hollow cavity by pressing the energy absorbing material into the cavity in segments including pressing each segment after insertion into the core sufficiently to cause peripheral edges of said plates surrounding the cavity to be embedded into the energy absorbing core.

28. A method according to claim 26, including filling the hollow cavity by heating the material for the energy absorbing core and forcing it to flow into the cavity.

29. A method according to claim 27, wherein the energy absorbing material is lead.

30. A method according to claim 26 including inserting said unitary structure into a second structure comprising a series of spaced parallel second plates and elastic material extending between and fixed to said second plates so that said unitary structure is embedded in said second structure.

* * * * *